United States Patent
Zhu et al.

(10) Patent No.: US 11,115,288 B2
(45) Date of Patent: Sep. 7, 2021

(54) PARAMETER SETTING METHOD, DATA ANALYSIS DEVICE AND DATA ANALYSIS SYSTEM

(71) Applicant: Hitachi, Ltd., Tokyo (JP)

(72) Inventors: Yuncheng Zhu, Tokyo (JP); Yoshiteru Takeshima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 260 days.

(21) Appl. No.: 16/122,921

(22) Filed: Sep. 6, 2018

(65) Prior Publication Data
US 2019/0158363 A1    May 23, 2019

(30) Foreign Application Priority Data
Nov. 17, 2017 (JP) .............................. JP2017-221725

(51) Int. Cl.
*H04L 12/24* (2006.01)
*H04L 12/26* (2006.01)
*H04L 29/08* (2006.01)

(52) U.S. Cl.
CPC .......... *H04L 41/145* (2013.01); *H04L 41/082* (2013.01); *H04L 41/0803* (2013.01); *H04L 41/142* (2013.01); *H04L 43/062* (2013.01); *H04L 41/16* (2013.01); *H04L 67/12* (2013.01)

(58) Field of Classification Search
CPC . H04L 41/145; H04L 41/0803; H04L 41/082; H04L 41/142; H04L 43/062
USPC ....................................................... 709/223
See application file for complete search history.

(56) References Cited

U.S. PATENT DOCUMENTS

| | | | | |
|---|---|---|---|---|
| 7,496,661 B1* | 2/2009 | Morford | ............. | H04L 41/5025 709/224 |
| 2007/0192474 A1* | 8/2007 | Decasper | ............ | H04L 67/1078 709/223 |
| 2010/0121972 A1* | 5/2010 | Samuels | ................. | H04L 47/10 709/231 |
| 2011/0066415 A1* | 3/2011 | Thompson | ........... | H04Q 3/0083 703/13 |

(Continued)

FOREIGN PATENT DOCUMENTS

| JP | 9-114517 A | 5/1997 |
|---|---|---|
| JP | 2000-181526 A | 6/2000 |

(Continued)

OTHER PUBLICATIONS

Japanese Office Action received in corresponding Japanese Application No. 2017-221725 dated Jan. 5, 2021.

*Primary Examiner* — Meng Vang
(74) *Attorney, Agent, or Firm* — Mattingly & Malur, PC

(57) ABSTRACT

A data analysis device executes: acquiring time-series data including data of multiple items from an analysis target system; extracting data of at least, one first item from the time series data; calculating a feature of a temporal change of the data of the first item; extracting data of at least one second item from the time series data; calculating a feature of at least one of a relevance between the data of the first item and the data of the second item and a relevance between the data of the multiple second items; determining a model corresponding to the analysis target system on the basis of the feature of the temporal change and the change of the relevance; and setting the parameter in the analysis target system by using the parameter setting configuration of the model.

11 Claims, 13 Drawing Sheets

(56) References Cited

U.S. PATENT DOCUMENTS

| | | | |
|---|---|---|---|
| 2012/0059921 A1* | 3/2012 | Serban | G06F 11/3664 709/223 |
| 2014/0288675 A1 | 9/2014 | Fujiwara et al. | |
| 2014/0334304 A1* | 11/2014 | Zang | H04L 47/2441 370/235 |
| 2015/0160098 A1 | 6/2015 | Noda et al. | |
| 2017/0012861 A1* | 1/2017 | Blumenthal | H04L 47/263 |

FOREIGN PATENT DOCUMENTS

| | | |
|---|---|---|
| JP | 2004-132817 A | 4/2004 |
| JP | 2008-059270 A | 3/2008 |
| JP | 2013-97615 A | 5/2013 |
| JP | 2013-143009 A | 7/2013 |
| JP | 2014-186631 A | 10/2014 |
| JP | 2015-88079 A | 5/2015 |
| JP | 2017-156811 A | 9/2017 |
| JP | 2017-190482 A | 10/2017 |

* cited by examiner

FIG. 3

| 301 | 302 | 303 | 304 | 305 | 306 | 307 | 308 | 309 | 310 |
|---|---|---|---|---|---|---|---|---|---|
| TIME | SOURCE IP | DESTINATION IP | PROTOCOL ID | SOURCE PORT | DESTINATION PORT | RATE | NUMBER OF RETRANSMISSION PACKETS | ICMP ERROR COUNT | RESET COUNT |
| 2017-10-01 00:00:00 | 1.2.3.4 | 5.6.7.8 | 6 | 14235 | 80 | 226 | 2 | 0 | 0 |
| 2017-10-01 00:00:00 | 9.8.7.6 | 5.6.7.8 | 6 | 24156 | 80 | 1 | 0 | 1 | 0 |
| 2017-10-01 00:00:00 | 1.2.5.6 | 7.6.5.4 | 6 | 13513 | 445 | 1 | 0 | 0 | 11 |
| 2017-10-01 00:00:00 | 3.4.5.6 | 7.7.8.8 | 17 | 12354 | 3389 | 15 | 0 | 0 | 0 |
| ... | ... | ... | ... | ... | ... | ... | ... | ... | ... |
| 2017-10-01 00:01:00 | 1.2.3.4 | 5.6.7.8 | 6 | 14235 | 80 | 117 | 11 | 0 | 0 |
| 2017-10-01 00:01:00 | 3.4.5.6 | 7.7.8.8 | 17 | 12354 | 3389 | 12 | 0 | 0 | 0 |
| ... | ... | ... | ... | ... | ... | ... | ... | ... | ... |

INPUT DATA INFORMATION TABLE 221

FIG. 4

| ITEM ID | ITEM NAME | ITEM TYPE |
|---|---|---|
| 1 | TIME | TS |
| 2 | SOURCE IP | KEY |
| 3 | DESTINATION IP | KEY |
| 4 | PROTOCOL ID | KEY |
| 5 | SOURCE PORT | KEY |
| 6 | DESTINATION PORT | KEY |
| 7 | RATE | V1 |
| 8 | NUMBER OF RETRANSMISSION PACKETS | V2 |
| 9 | ICMP ERROR COUNT | V2 |
| 10 | RESET COUNT | V2 |

DATA ITEM INFORMATION TABLE 222

FIG. 5

| MODEL ID | MODEL NAME | MODEL DETERMINATION CONDITION |
|---|---|---|
| 1 | HOME NETWORK | DETERMINATION CONDITION OF MODEL 1 |
| 2 | BUSINESS NETWORK | DETERMINATION CONDITION OF MODEL 2 |
| 3 | SENSOR NETWORK | DETERMINATION CONDITION OF MODEL 3 |
| ⋮ | ⋮ | ⋮ |

MODEL INFORMATION TABLE 223

FIG. 6

| MODEL ID | PARAMETER ID | PARAMETER CONFIGURATION |
|---|---|---|
| 1 | rate.cluster_number | 10 |
| 1 | rate.threshold | 5 |
| 1 | retry_ratio.threshold | 0 |
| 1 | flow.threshold | N (SCALE) |
| ⋮ | ⋮ | ⋮ |
| 2 | rate.cluster_number | 5 |
| 2 | rate.threshold | 3 |
| 2 | retry_ratio.threshold | 3*(MEAN (NUMBER OF RETRANSMISSION PACKETS) /MEAN (RATE)) |
| ⋮ | ⋮ | ⋮ |

CONFIGURATION INFORMATION TABLE 224

FIG. 7

| PARAMETER ID | PARAMETER VALUE |
|---|---|
| model.id | 2 |
| rate.cluster_number | 5 |
| rate.threshold | 3 |
| ⋮ | ⋮ |
| retry_ratio.threshold | 0.129 |
| ⋮ | ⋮ |

PARAMETER INFORMATION TABLE 225

RELEVANCE FEATURE CALCULATION PROCESS

MODEL DETERMINATION PROGRAM

INPUT DATA INFORMATION TABLE 1321

DATA ITEM INFORMATION TABLE 1322

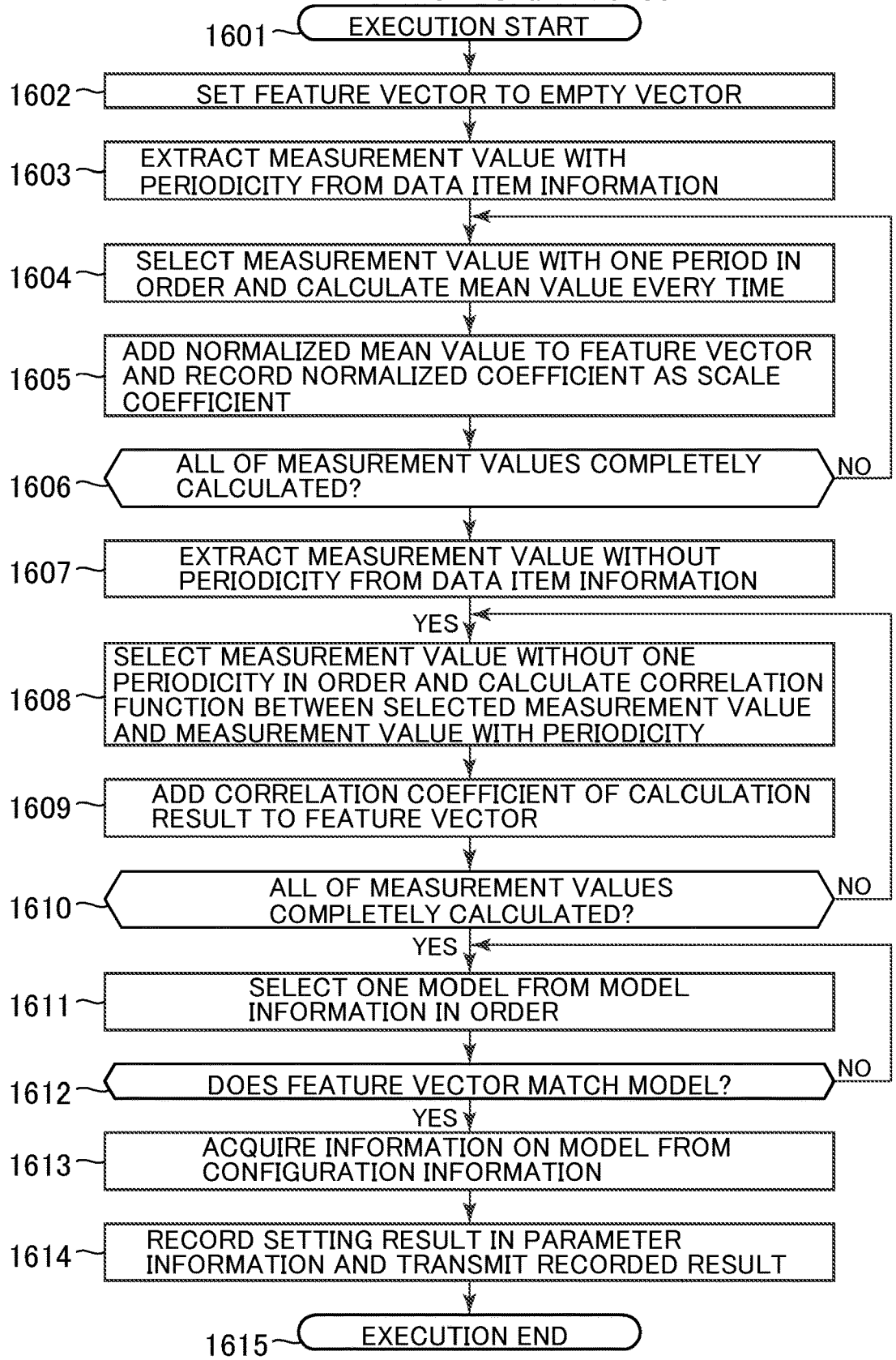

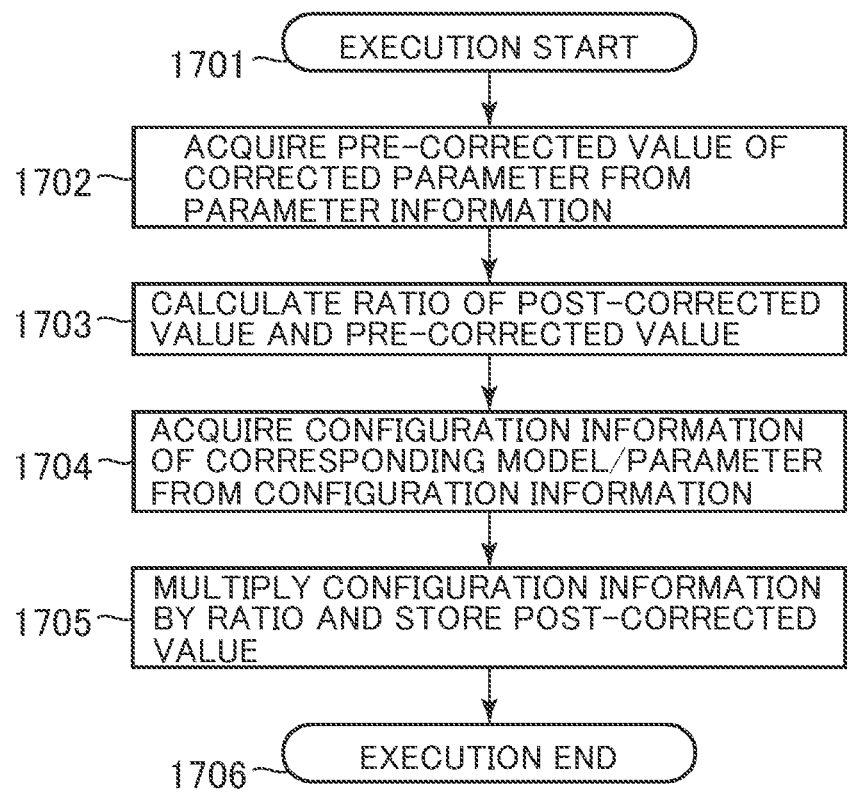

PARAMETER SETTING METHOD, DATA ANALYSIS DEVICE AND DATA ANALYSIS SYSTEM

INCORPORATION BY REFERENCE

This application claims priority based on Japanese patent application, No. 2017-221725 filed on Nov. 17, 2017, the entire contents of which are incorporated herein by reference.

BACKGROUND

The present invention relates to a data analysis device that monitors time-series data.

In recent years, as an IoT (Internet of Things) technology to connect various elements to collect data spreads, various elements are connected to a network. There are systems in which various elements are connected to the network, thereby being capable of monitoring a target device and a target system with the use of time-series data collected from those elements and analyzing the data. In such a system, data or a state of a monitoring target is collected and a deviation from a reference value of the data is compared with a threshold value to detect an abnormality of the monitoring target.

In order to realize such monitoring and analysis methods, for example, there is a need to set in advance plural kinds of parameters such as a reference value of the data and a threshold of a divergence degree. As a technique for supporting setting of parameters, a method has been proposed in which parameters are determined according to preliminary information on the state of the monitoring target. For example, Japanese Unexamined Patent Application Publication No. 2008-59270 discloses a process abnormality diagnosis device including a preliminary information generation unit that generates preliminary information relating to a ratio between abnormal data and normal data included in statistic amount data, a threshold determination unit that determines a threshold for determining an abnormal state or a normal state of the statistic amount data, and an abnormality diagnosis unit that diagnoses the abnormality of a target process with the use of the threshold and the statistic amount data determined by the threshold determination unit.

In addition, as a technique for supporting setting of a parameter, a method of updating the parameter at the time of updating an analysis result has been proposed. Japanese Unexamined Patent Application Publication No. 2013-97615 discloses a clustering device that repeats, in addition to determining the number of clusters when updating a cluster allocation variable, updating a cluster allocation variable, updating a feature selection variable, updating a feature selection parameter, updating a feature observation parameter, updating a noise observation parameter, updating a cluster transition parameter, and updating a mixture ratio parameter until a predetermined termination condition is satisfied.

SUMMARY

However, in a parameter setting technology disclosed in Japanese Unexamined Patent Application Publication No. 2008-59270, there is a need to input the preliminary information on the monitoring target such as the ratio between the abnormal data and the normal data. In addition, in the parameter setting technology disclosed in Japanese Unexamined Patent Application Publication No. 2013-97615, there is a need to input in advance a constant called a hyper parameter for parameter updating, and the effect of parameter update is influenced by an initial setting. For that reason, in the conventional art, when there is no preliminary information, it is difficult to set parameters suitable for the monitor feature.

The present invention has been made in view of the above circumstances, and aims at setting an appropriate parameter based on analysis results of features of time series data including multiple items acquired from a monitoring target.

An outline of representative one of the inventions disclosed in the present application will be briefly described as follows. A data analysis device that can set a parameter, the data analysis device having a computer having an arithmetic device that executes a predetermined process, a storage device that is connected to the arithmetic unit, and a communication interface that is connected to the arithmetic device, includes: a configuration accumulation unit that accumulates a parameter setting configuration for each model corresponding to an analysis target system; a data input unit that acquires time-series data including data of a plurality of items from the analysis target system; a temporal change feature calculation unit that extracts data of at least one first item from the time series data and calculates a feature of a temporal change of the data of the first item; a relevance feature calculation unit that extracts data of at least one second item from the time series data and calculates a feature of at least one of a relevance between the data of the first item and the data of the second item and a relevance between the data of a plurality of the second items; a model determination unit that determines a model corresponding to the analysis target system based on the feature of the temporal change and the change of the relevance; and a parameter setting unit that sets the parameter in the analysis target system by using the parameter setting configuration of the model corresponding to the analysis target system.

According to the present invention, the parameter suitable for the monitoring target system can be set.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram showing a configuration example of an input data information table according to the first embodiment.

FIG. 4 is a diagram showing a configuration example of a data item information table according to the first embodiment.

FIG. 5 is a diagram showing a configuration example of a model information table according to the first embodiment.

FIG. 6 is a diagram showing a configuration example of a configuration information table according to the first embodiment.

FIG. 7 is a diagram showing a configuration example of a parameter information table according to the first embodiment.

FIG. 16 is a flowchart of a process to be executed by a parameter setting program according to the second embodiment.

FIG. 17 is a flowchart of a process to be executed by a configuration correction program according to the second embodiment.

DETAILED DESCRIPTION

Hereinafter, embodiments of the present invention will be described with reference to the drawings.

For the sake of convenience, in the following embodiments, a description is divided into multiple sections or embodiments, but unless otherwise specified, the divided descriptions are not unrelated to each other, and one description has a relationship with a modification, details, a supplementary description or the like of a part or all of the other description.

In addition, in the following embodiments, when the number or the like (including number, numerical value, quantity, range, etc.) of components is mentioned, except for a clearly specified case and a case where a limitation is obviously made to a specific number in principle, no limitation is made to the specific number, and a number larger or smaller than the specific number may be adopted.

Further, in the following embodiments, it is needless to say that a component (including a component step etc.) is not necessarily inevitable except for a clearly specified case and a case where the component is obviously inevitable in principle.

Further, the following embodiments may be applied singly, or a plurality of or all of the embodiments may be applied in combination.

First Embodiment (Network Traffic Analysis System)

Figure 1:
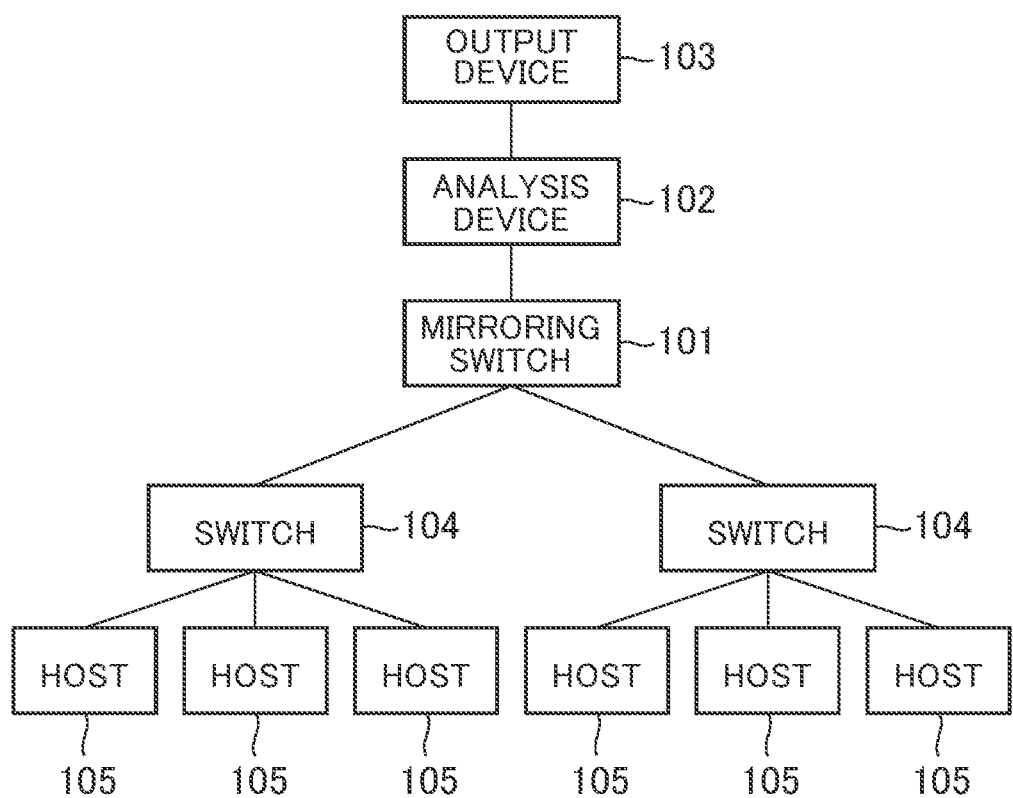
FIG. 1 is a diagram showing a configuration of a network traffic analysis system according to a first embodiment.

In the present embodiment, an example will be described in which as shown in FIG. 1, in a network traffic analysis system including a mirroring switch 101, an analysis device 102, and an output device 103, the analysis device 102 calculates statistical data for each traffic flow from a network packet acquired from the mirroring switch 101. In addition, the analysis device 102 extracts at least one preset item (a first item whose data periodically changes) from the network packet acquired from the mirroring switch 101 and calculates a feature of a temporal change of the data of the first item. Then, the analysis device 102 extracts at least another preset (second item) from the network packet acquired from the mirroring switch 101 and calculates a feature of a relevance between the data of the first item and the data of the second item. Then, the analysis device 102 determines to which of multiple models the network system to be analyzed belongs based on the calculated feature of the temporal change and sets an analysis parameter to be applied to the analysis target system with the use of parameter setting information corresponding to the model to which the analysis target system belongs. The analysis device 102 analyzes a traffic of the network system to be analyzed with the use of the set parameter.

FIG. 1 is a diagram showing a configuration of the network traffic analysis system according to the first embodiment.

The network traffic analysis system according to the first embodiment includes a mirroring switch 101, an analysis 102, network devices (hereinafter referred to as switches) 104, and network terminals (hereinafter referred to as host computers) 105.

The mirroring switch 101 connects two or more switches 104, transfers a network packet between those switches 104, duplicates the packet to be transferred, and transmits the duplicated packet to the analysis device 102. The mirroring switch 101 may be configured by a switch device with a mirroring function as well as a DPI (deep packet Inspector) device, a TAP device that branches and extracts a network signal, or the like.

The analysis device 102 analyzes a state of the network system (including the switches 104 and the host 105) to be analyzed from the network packet acquired from the mirroring switch 101, and transmits an analysis result to the output device 103.

The output device 103 visualizes the data received from the analysis device 102 and informs a user of a state of the network system. For example, the output device 103 is a terminal computer connected to the analysis device 102.

The switch 104 is a device that transfers packets and frames in a wired or wireless network such as a switching hub, a router, a wireless access point, or a wireless base station. As shown in FIG. 1, the host computers 105 may be connected to the mirroring switch 101 through the switches 104, or the host computers 105 may be connected directly to the mirroring switch 101.

Figure 2:
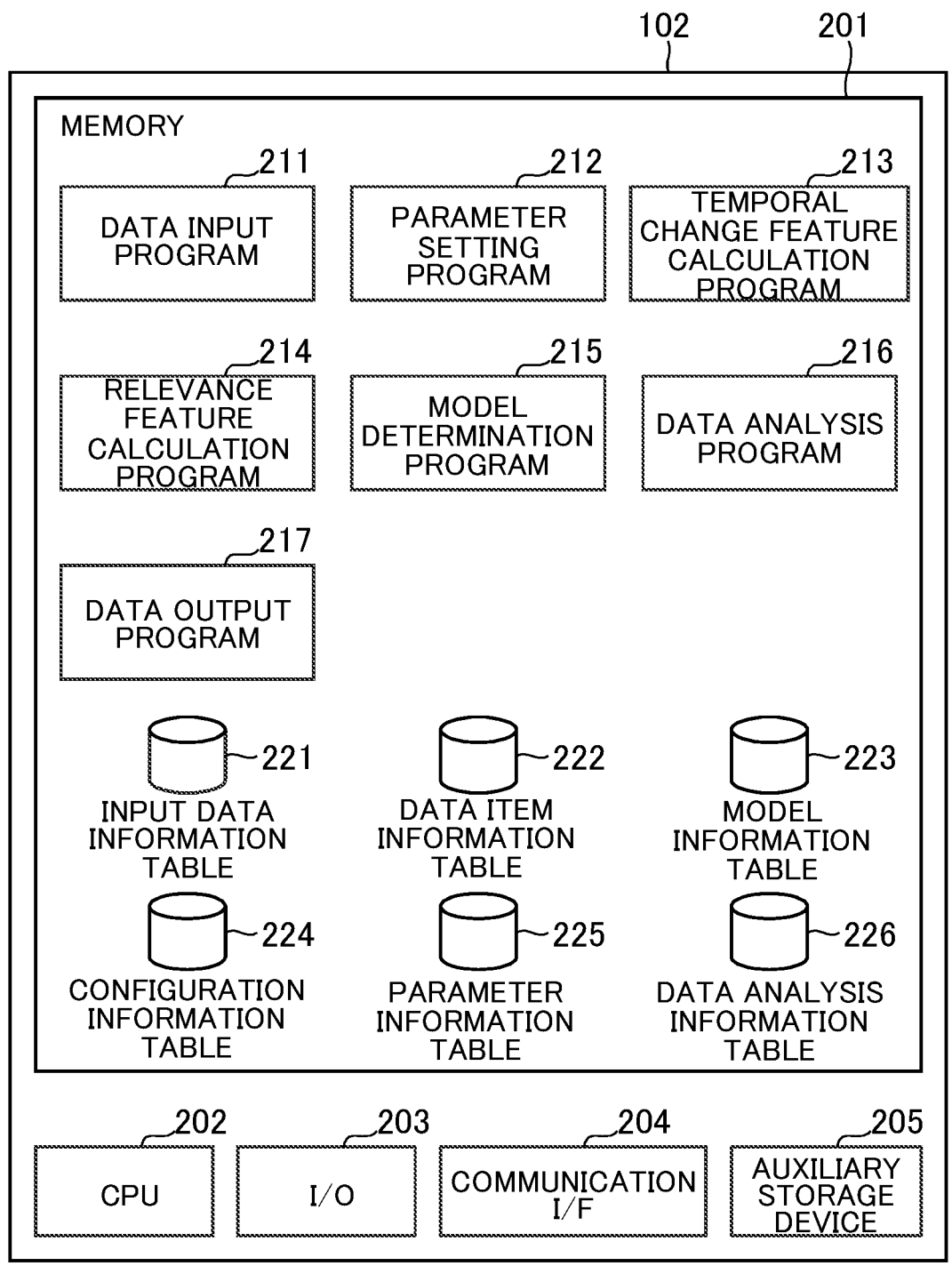
FIG. 2 is a diagram showing a configuration of an analysis device according to the first embodiment.

FIG. 2 is a diagram showing a configuration of the analysis device 102 according to the first embodiment.

The functions of the analysis device 102 according to the present embodiment are stored in a form of a program in an auxiliary storage device 205 of a general computer. The program is read out from the auxiliary storage device 205, developed in a memory 201, and executed by a CPU 202. Incidentally, a part of a process to be performed by allowing the CPU 202 to execute the program may be performed by hardware (for example, FPGA).

The analysis device 102 is connected to the mirroring switch 101 through at least one of an input/output interface 203 and a communication interface 204. Similarly, the analysis device 102 is connected to the output device 103 through at least one of the input/output interface 203 and the communication interface 204.

The memory 201 of the analysis device 102 stores a data input program 211, a parameter setting program 212, a temporal change feature calculation program 213, a relevance feature calculation program 214, a model determination program 215, a data analysis program 216, and a data output program 217.

The data input program 211 receives the network packets from the mirroring switch 101. The parameter setting program 212 sets an analysis parameter suitable for the analysis target system according to the received data. The temporal change feature calculation program 213 calculates the temporal change feature for setting the analysis parameter. The relation feature calculation program 214 calculates a relevance feature for setting the analysis parameter. The model determination program 215 determines a model for setting the analysis parameter. The analysis program 216 analyzes a network traffic of the analysis target system with the use of the set analysis parameter. The data output program 217 transmits the analysis result to the output device 103.

Further, the memory 201 of the analysis device 102 stores an input data information table 221 (refer to FIG. 3), a data item information table 222 (refer to FIG. 4), a model information table 223 (refer to FIG. 5), a configuration information table 224 (refer to FIG. 4), a parameter information table 225 (refer to FIG. 7), and a data analysis information table 226.

The input data information table 221 stores the statistical data for each traffic flow calculated from the network packet. The data item information table 222 stores information on the data items included in the input data. The model information table 223 stores information on an analysis model to which the analysis target system is likely to belong. The configuration information table 224 stores parameter setting configuration information corresponding to each model. The parameter information table 225 stores the setting result information on the analysis parameter applied to the analysis target system. The data analysis information table 226 stores information related to the data analysis.

Incidentally, although the configuration in which various programs and various kinds of information are stored in the memory of one computer is shown in the analysis device 102 of the present embodiment, those pieces of information may be stored in the auxiliary storage device 205, information may be read from the auxiliary storage device 205 and stored in the auxiliary storage device 205 each time each process is completed.

In addition, the program and the information may be distributed and stored in multiple computers. For example, various kinds of information is mounted as a table of the database, stored in a database server different from that of the analysis device 102, and the program to be executed on the analysis device 102 may refer to and update the information on the database server.

The above-described difference in the method of storing information does not affect the essence of the present invention.

A program to be executed by the CPU 202 is provided to the analysis device 102 through a removable medium (CD-ROM, flash memory, or the like) or a network, and stored in a nonvolatile auxiliary storage device 205 which is a non-transitory storage medium. For that reason, the analysis device 102 may have an interface for reading data from the removable media.

The analysis device 102 is a computer system physically configured on one computer or on multiple computers configured logically or physically. The analysis device 102 may operate on a separate thread on the same computer or may operate on a virtual machine built on multiple physical computer resources.

FIG. 3 is a diagram showing a configuration example of the input data information table 221 held by the analysis device 102.

The input data information table 221 includes a time 301, a source IP 302, a destination IP 303, a protocol ID 304, a source port 305, a destination port 306, a rate 307, the number of retransmission packets 308, an ICMP error count 309, and a reset count 310.

The time 301 indicates a time at which traffic flow data has been recorded. The source IP 302 indicates an IP address of the source of the traffic flow. The destination IP 303 indicates an IP address of the destination of the traffic flow. The protocol ID 304 indicates a transport layer protocol of the traffic flow. The source port 305 indicates a transport layer source port number of the traffic flow. The destination port 306 indicates a transport layer destination port number of the traffic flow. The rate 307 indicates a bit rate of the traffic flow. The number of retransmitted packets 308 indicates the number of retransmitted packets of the traffic flow. The ICMP error count 309 indicates the number of ICMP errors that have occurred within the traffic flow. The number of times of reset 310 indicates the number of times of resetting of TCP or the like occurring in the traffic flow.

The input data information table 221 shown in FIG. 3 shows an example in which the traffic flow data is recorded per minute, but the traffic flow data may be recorded at other intervals.

FIG. 4 is a diagram showing a configuration example of the data item information table 222 held by the analysis device 102.

The data item information table 222 includes a data item ID 401 indicating an identifier of an order of the item, an item name 402 indicating a name of the item, and an item type 403 indicating the type of the item.

In FIG. 4, the items of the rows of a table correspond to columns of the input data information table 221. In FIG. 4, the item type 403 shows four types of "TS" indicating a time stamp, "KEY" indicating an identifier of the traffic flow, "V1" indicating a predetermined first item, and "V2" indicating a predetermined second item. In addition, other item types that can be used for parameter setting and data analysis may be present.

FIG. 5 is a diagram showing a configuration example of the model information table 223 held by the analysis device 102.

The model information table 223 includes a model ID 501 indicating an identifier of the model, a model name 502 indicating a name of the model, and a model determination condition 503 indicating a condition for determining whether the analysis target system corresponds to the model, or not.

A model is a mathematical analysis method corresponding to an event of a target system based on input data. In order to adequately describe the behavior of the input data, a model that fits statistical distribution of the data is necessary. FIG. 5 shows multiple models including a home network, a business network, and a sensor network. Those network systems are different, for example, in a statistical distribution indicating a change in the bit rate of traffic. In addition, a condition for determination of whether to correspond to each model, or not, is determined for the model. The determination condition is whether a distance between a feature vector calculated from the input data and a specific feature vector of the model falls within a fixed threshold, or not. Also, for example, an appropriate model may be determined from multiple models under one condition with the use of, for example, a cluster analysis, learned SVM (support vector machine), DNN (deep neural network), or the like.

FIG. 6 is a diagram showing a configuration example of the configuration information table 224 held by the analysis device 102.

The configuration information table 224 includes a model ID 601 indicating the identifier of the model, a parameter ID 602 indicating the identifier of the analysis parameter, and a parameter configuration 603 indicating the configuration information on the analysis parameter. The analysis parameter to be set is uniquely specified in the model in question in the analysis target system by the model ID 601 and the parameter ID 602.

The parameter defined in the parameter configuration 603 may be a constant, but it may be a calculation expression including a scale factor Nora statistical value of a data item (for example, MEAN (number of retransmitted packets), MEAN (rate)). In addition, the parameter configuration 603 may be defined in a format that can be processed by the analysis device 102 such as a calculation script.

FIG. 7 is a diagram showing a configuration example of the parameter information table 225 held by the analysis device 102.

The parameter information table 225 includes a parameter ID 701 indicating the identifier of the analysis parameter and a parameter value 702 indicating the setting result of the analysis parameter.

Although illustration of a configuration example of the data analysis information table 226 held by the analysis device 102 will be omitted, the data analysis information table 226 stores learning data and analysis results of data analysis performed depending on the model. Examples of the learning data include statistical analysis results of linear and nonlinear regression analysis and learned models of machine learning such as clusters. Examples of analysis results include event records and abnormality score of analysis target system.

The data input program 211 to be executed by the analysis device 102 exchanges information with the mirroring switch 101 through at least one of the input/output interface 203 and the communication interface 204, and acquires the network packet of the analysis target system. The data input program 211 calculates the statistical value for each traffic flow based on the network packet received at a predetermined fixed time interval and stores the calculated statistical value in the input data information table 221.

Figure 8:
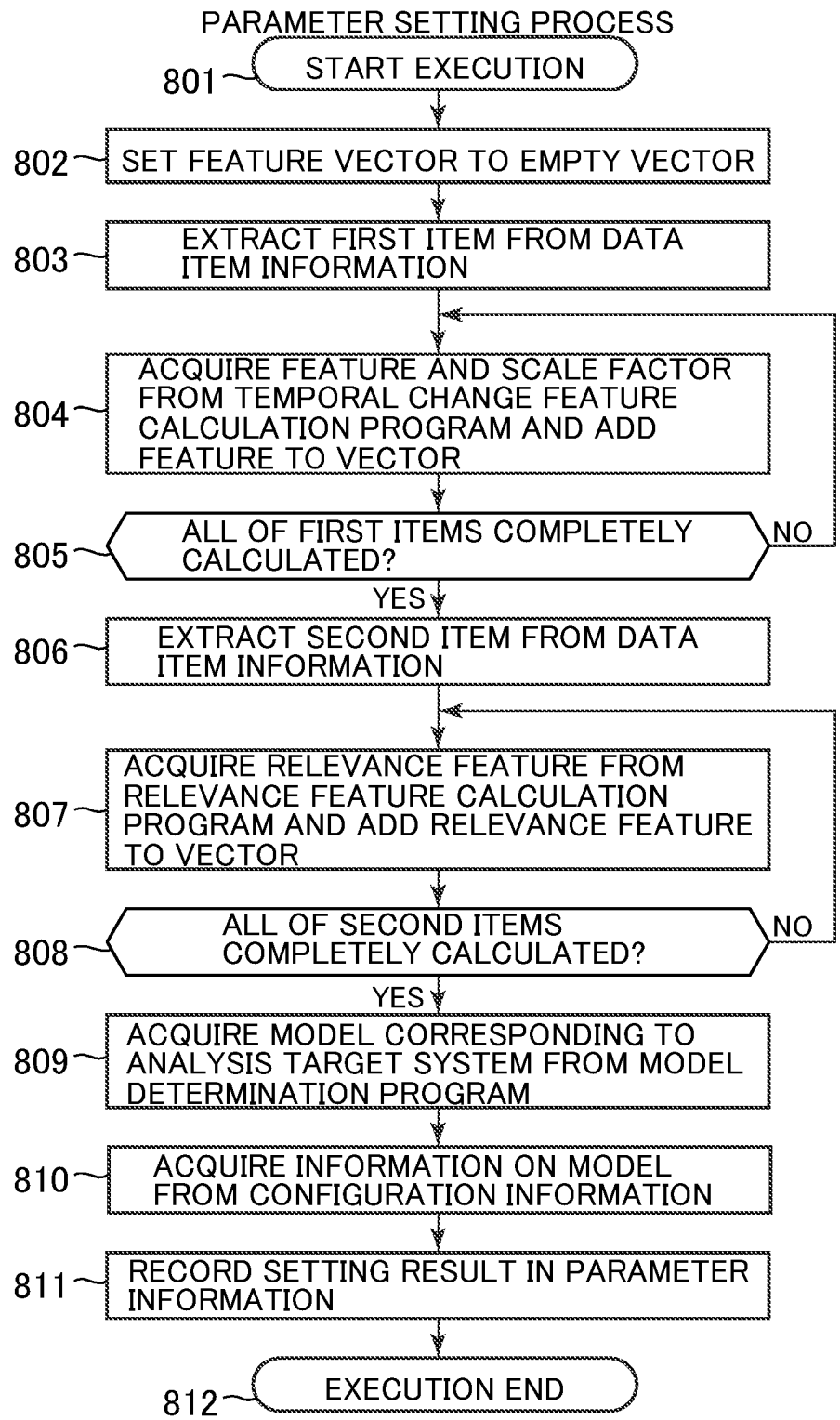
FIG. 8 is a flowchart of a process to be executed by a parameter setting program according to the first embodiment.

FIG. 8 is a flowchart of processing by the parameter setting program 212 to be executed by the analysis device 102.

In Step 801, the analysis device 102 activates the parameter setting program. 212 with storage of a predetermined amount of data (for example, data for one day) in the input data information table 221 as a trigger. Incidentally, the analysis device 102 may activate the parameter setting program 212 with satisfaction of a predetermined condition such as elapse of a predetermined time (for example, one month) or detection of specific data by the data analysis program 216 as a trigger.

In Step 802, the analysis device 102 sets a feature vector of the analysis target system to an empty vector (V=[ ]).

In Step 803, the analysis device 102 extracts a data item whose item type 403 is a first item (V1) from the data item information table 222.

In Step 804, the analysis device 102 selects one item in order from the extracted first items, specifies the data item ID 401 of the selected item, delivers the specified data item ID 401 to the temporal change feature calculation program 213 (FIG. 9), acquires a temporal change feature ([x1, x2, . . . , xn]) and a scale factor n of the data item, and add the temporal change feature to the feature vector (V=[x1, x2, . . . , xn]).

in Step 805, the analysis device 102 determines whether calculation of all the first items has been completed, or not. If the calculation of some of the first items has not been completed, the analysis device 102 returns to step 804 and selects the next first item. On the other hand, if the calculation of all the first items has been completed, the analysis device 102 proceeds to Step 806 and extracts the data item whose item type 403 is the second item (V2) from the data item information table 222.

In Step 307, the analysis device 102 selects one item in order from the extracted second item, specifies the selected data item ID 401 and the scale factor n, delivers the designated data item ID 401 and scale factor n to the relevance feature calculation program 214 (FIG. 10), acquires a relevance feature y of the data item, and adds the acquired relevance feature y to the feature vector (V=[x1, x2, . . . , xn, y]).

In Step 808, the analysis device 102 determines whether the calculation of all the second items has been completed, or not. If the calculation of some of the second items has not been completed, the analysis device 102 returns to Step 801, and selects the next second item. On the other hand, if the calculation of all the second items has been completed, the analysis device 102 proceeds to Step 809, delivers the feature vector to the model determination program 215 (FIG. 11), and acquires the model ID 501 of the model to be analyzed by the analysis target system.

In Step 810, the analysis device 102 acquires from the configuration information table 224 the parameter configuration information that matches the model ID 501 matched with the model ID 601.

In Step 811, the analysis device 102 calculates the analysis parameter based on the acquired parameter configuration information and stores the calculated analysis parameter in the parameter information table 225.

Finally, in Step 812, the analysis device 102 completes the parameter setting program 212.

Figure 9:
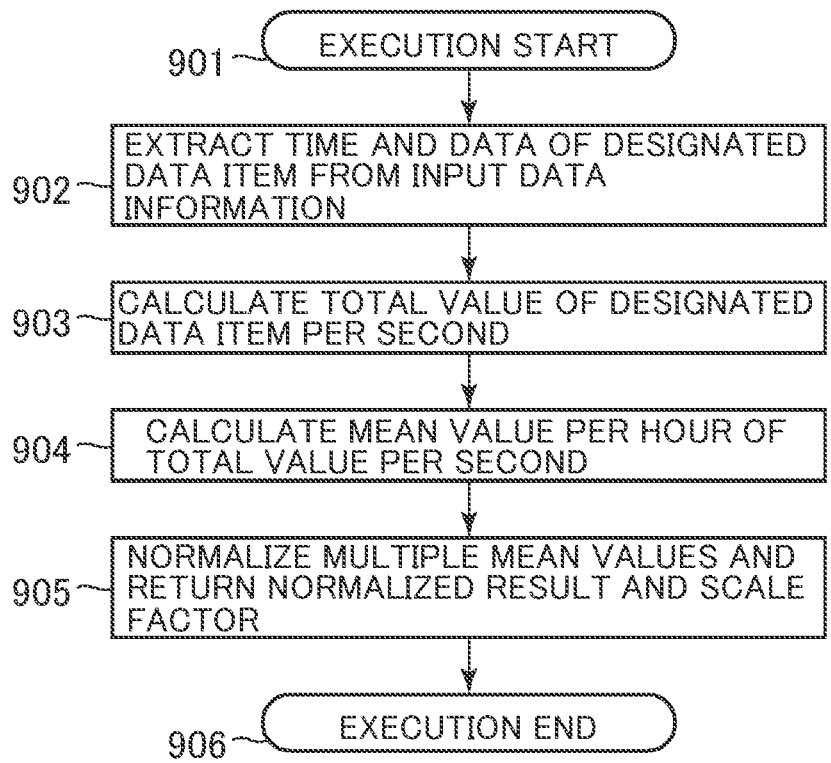
FIG. 9 is a flowchart of a process to be executed by a temporal change feature calculation program according to the first embodiment.

FIG. 9 is a flowchart of processing by the temporal change feature calculation program 213 to be executed by the analysis device 102.

In Step 901, the analysis device 102 activates the temporal change feature calculation program 213 with the data Item ID 401 of the first item designated by the parameter setting program 212 as an argument.

In Step 902, the analysis device 102 acquires all the data of the data item column designated as the time column 301 from the input data Information table 221.

In Step 903, the analysis device 102 calculates a total value of data that matches the time column 301 to the extent of seconds, and calculates the total value of the data of the designated data item column per second.

In Step 904, the analysis device 102 calculates an average value per hour of the calculated total value per second, and calculates the average value (for example, 1000, 2000, 6000, 8000, . . . , 2000, 1000) per hour of the data of the designated data item column. In Step 904, the analysis device 102 may calculate other statistical values (for example, variance, deviation value, maximum value, minimum value, and so on) instead of the average value.

In Step 905, the analysis device 102 normalizes the calculated average value per hour so that a maximum value becomes 1, and the normalized result (0.125, 0.25, 0.75, 1, . . . , 0.25, 0.125) and a normalization coefficient at the time of normalization as a scale factor (n=8000) to the parameter setting program 212.

Finally, in Step 906, the analysis device 102 completes the temporal change feature calculation program 213.

Figure 10:
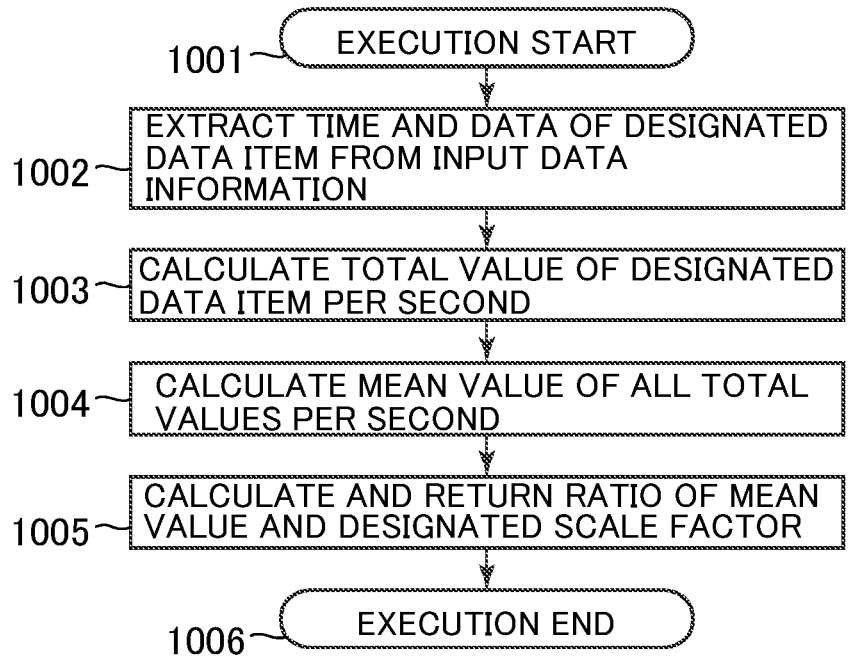
FIG. 10 is a flowchart of a process to be executed by a relevance feature calculation program according to the first embodiment.

FIG. 10 is a flowchart of processing by the relevance feature calculation program 214 to be executed by the analysis device 102.

In Step 1001, the analysis device 102 activates the relevance feature calculation program 214 with the data item ID 401 of the second item designated by the parameter setting program 212 and the scale factor n as arguments.

In Step 1002, the analysis device 102 acquires all the data of the data item column designated as the time column 301 from the input data information table 221.

In Step 1003, the analysis device 102 calculates the total value of the data that matches the time column 301 to the extent of seconds, and calculates the total value of the data of the designated data item column per second.

In Step 1004, the analysis device 102 calculates the average value of the calculated total value per second and calculates the average value of the overall data of the designated data item column. In Step 1004, the analysis device 102 may calculate other statistical values (for example, variance, deviation value, maximum value, minimum value, and so on) instead of the average value.

In Step 1005, the analysis device 102 calculates a ratio between the calculated overall average value and the designated scale factor and returns the calculated ratio to the parameter setting program 212. In this example, since the scale factor is a normalization coefficient for normalization of the data of the first item, the scale factor is a maximum value of the data of the first item. In Step 1005, the analysis device 102 calculates the ratio between the average value of the data of the designated data item and the scale factor. This means the calculation of a ratio between the average value of the data of the designated second item and the maximum value of the data of the first item of a calculation source of the designated scale factor. For that reason, in Step 1005, a ratio between a statistical value of the data of the first item and a statistical value of the data of the second item is calculated.

In Step 1005, the ratio between the statistical value of the data of the first item and the statistical value of the data of the second item is calculated, but a ratio of the statistical values of the data of the two second items may be calculated.

Finally, in Step 1006, the relevance feature calculation program 214 is terminated.

Figure 11:
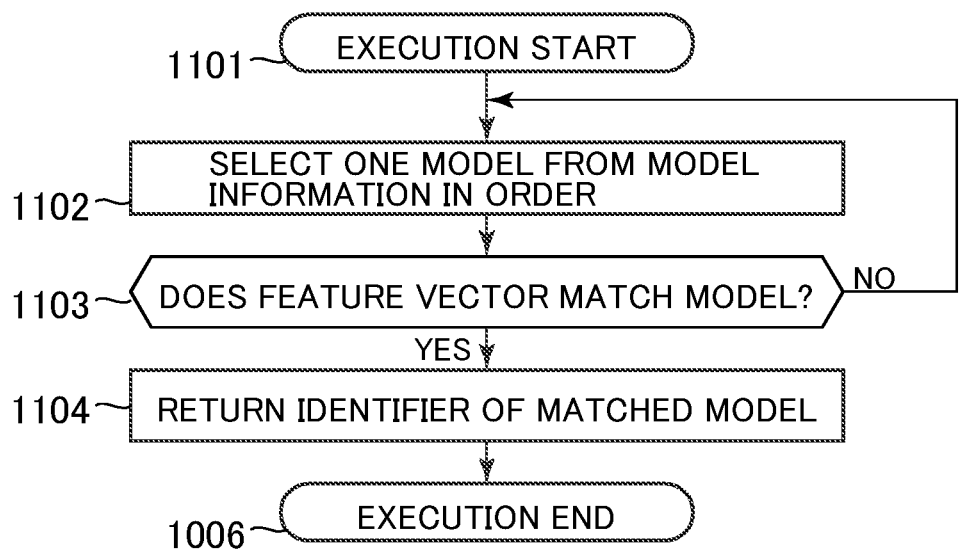
FIG. 11 is a flowchart of a process to be executed by a model determination program according to the first embodiment.

FIG. 11 is a flowchart of processing by the model determination program 215 to be executed by the analysis device 102.

In Step 1101, the analysis device 102 activates the model determination program 215 with a feature vector V designated by the parameter setting program 212 as an argument.

In Step 1102, the analysis device 102 selects one model in order from the model information table 223.

In Step 1103, the analysis device 102 determines whether a given feature vector satisfies the selected model determination condition 503, or not. If the feature vector does not satisfy the determination condition 503 of the selected model, the analysis device 102 returns to Step 1102, and selects the next model. On the other hand, if the feature vector satisfies the determination condition 503 of the selected model, the analysis device 102 proceeds to Step 1104 and returns the model ID 501 of the model satisfying the condition to a parameter setting program 212.

Finally, in Step 1105, the model determination program 215 is terminated.

The data analysis program 216 to be executed by the analysis device 102 analyzes data with respect to the analysis target system and stores the learning data and analysis results in the data analysis information table 226.

For example, the data analysis program 216 acquires all the traffic flow statistical data from the input data information table 221, with the storage of the analysis parameter in the parameter information table 225 as a trigger and acquires the analysis parameter from the parameter information table 225. Then, the data analysis program 216 performs machine learning such as statistical analysis results of linear and nonlinear regression analysis and clusters based on analysis parameters with the acquired input data as learning data, and stores the learned model in the data analysis information table 226.

Further, with the storage of new input data in the input data information table 221 as a trigger, the data analysis program 216 may acquire the latest traffic flow statistical data from the input data information table 221, acquire the analysis parameter from the parameter information table 225, acquire the learning data from the data analysis information table 226, perform a mathematical analysis on the input data based on the acquired learning data and analysis parameters, and store an abnormality degree score of the analysis target system in the data analysis information table 226. In that case, if the abnormality score of the analysis result exceeds a predetermined threshold, the analysis device 102 may operate the data output program 217.

The data output program 217 to be executed by the analysis device 102 exchanges information with the output device 103 through at least one of the input/output interface 203 and the communication interface 204, and outputs the analysis result to the analysis target system.

For example, with the elapse of a predetermined time as a trigger, the data output program, 217 acquires the data analysis result from the data analysis information table 226, shapes the obtained data analysis result, and outputs the shaped data analysis result to the output device 103. Also, with an event detection of the data analysis program 216 as a trigger, the data output program 211 may acquire the data analysis result from the data analysis information table 226, shape the obtained data analysis result, and output the shaped data analysis result to the output device 103.

As described above, in the present embodiment, in the network traffic analysis system including the mirroring switch 101, the analysis device 102, and the output device 103, the analysis device 102 calculates the statistical data for each traffic flow from the network packet acquired from the mirroring switch 101. Further, the analysis device 102 extracts the data of the first item from the network packet acquired from the mirroring switch 101, calculates the statistical value of the data of the first item at each time, extracts the data of the other second item from the network packet acquired from the mirroring switch 101, and calculates a ratio of the statistical value between the data of the first item and the data of the second item. The analysis device 102 then determines a model corresponding to the analysis target system based on the statistical value per hour and the ratio of the statistical values, and sets the analysis parameter to be applied to the analysis target system with the use of the parameter setting configuration corresponding to the determined model. Also, the analysis device 102 analyzes the network traffic of the analysis target system with the use of the parameters. As a result, the analysis device 102 can analyze the feature of the analysis target system based on the statistical data of the traffic flow including the multiple items acquired from the analysis target system, and automatically set the analysis parameter suitable for the analysis target system. In addition, since the analysis parameter suitable for the analysis target system is automatically set, an investigation cost and a time loss for setting the analysis parameters are reduced, thereby being capable of improving failure prevention and QoE (quality of experience).

Further, the analysis device 102 normalizes the statistical value of the first item per hour, records the normalization coefficient at the time of normalization as the scale factor of the analysis target system, and calculates the parameter suitable for the scale of the analysis target system with the scale factor as an argument. As a result, the analysis device 102 can set the analysis parameter suitable for not only the qualitative feature of the analysis target system but also the quantitative feature.

Second Embodiment (IoT Sensor Information Analysis System)

In a second embodiment, a setting device 1202 connected to an IoT sensor information analysis system inducing a data storage device 1203, a communication path 1204, an IoT gateway 1205, and a sensor 1206 identifies the type of each data item from sensing data acquired from the data storage device 1203. The setting device 1202 extracts a periodic measurement value from the data, calculates a temporal change feature of the periodic measurement value, extracts a non-periodic measurement value from the data, and calculates a relevance feature between the periodic measurement value and the non-periodic measurement value. The setting device 1202 determines a model to which the analysis target belongs based on the temporal change feature and the relevance feature, sets an analysis parameter to be applied to the analysis target with the use of the parameter setting configuration corresponding to the model to which the analysis target belongs, and transmits the set analysis parameter to the analysis device.

Figure 12:
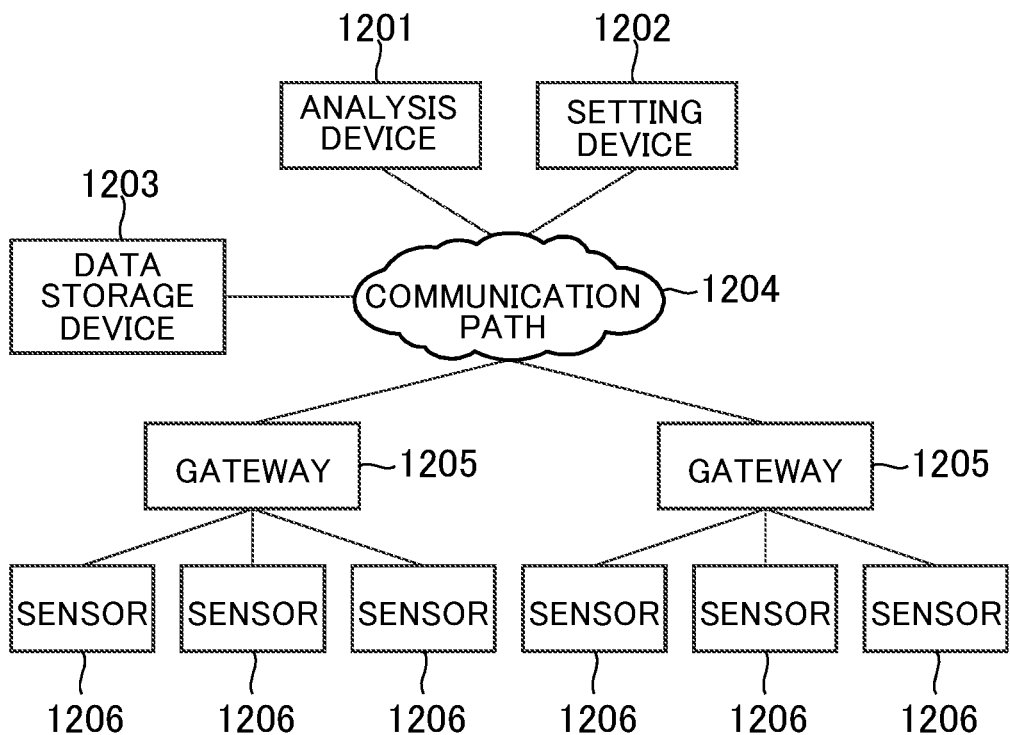
FIG. 12 is a diagram showing a configuration of an IoT sensor information analysis system according to a second embodiment.

FIG. 12 is a diagram showing a configuration of an IoT sensor information analysis system according to a second embodiment. In the description of the second embodiment, a description of the configuration, function, and processing having the same names as those of the first embodiment described above will be omitted.

The IoT sensor information analysis system according to the second embodiment includes an analysis device 1201, a setting device 1202, a data storage device 1203, a communication path 1204, an IoT gateway 1205, and a sensor 1206.

The analysis device 1201 is a computer that analyzes a state to be analyzed with the use of sensing data. The setting device 1202 is a computer that provides appropriate analysis parameters to the analysis device 1201. The data storage device 1203 is a computer that exchanges information with the IoT gateway 1205, receives the sensing data measured by the sensor 1206, shapes the received sensing data, and provides the shaped sensing data to the analysis device 1201 and the setting device 1202. The communication path 1204 is either a wired or a wireless network, or may be a single network or a combination of multiple networks.

Figure 13:
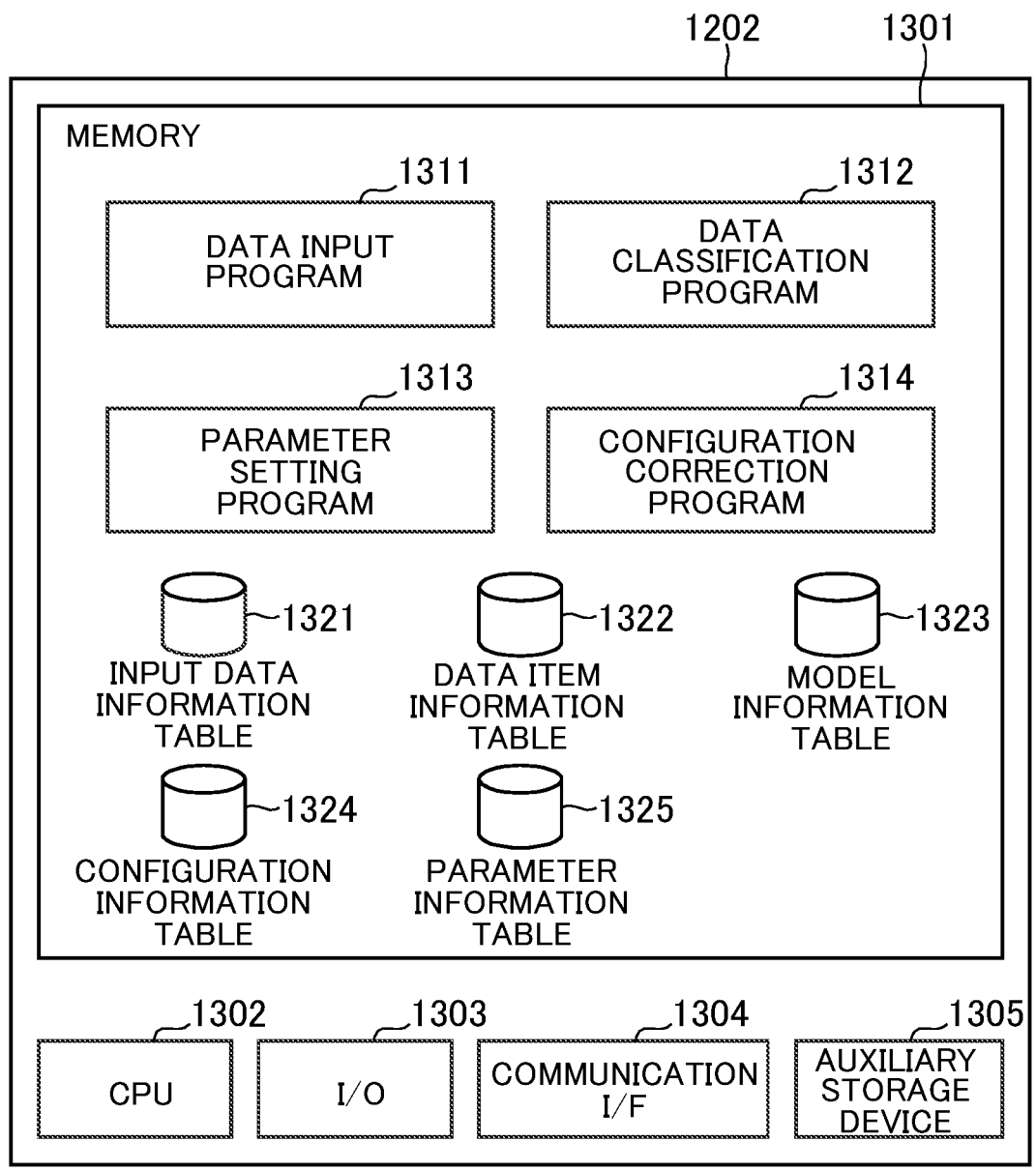
FIG. 13 is a diagram showing a configuration of a setting device according to the second embodiment.

FIG. 13 is a diagram showing a configuration of the setting device 1202 according to the second embodiment. Incidentally, a description of the same configurations as those of the analysis device 102 in the first embodiment will be omitted.

The function of the setting device 1202 according to the second embodiment is stored in the form of a program in an auxiliary storage device 205 of a general computer. The program is read out from the auxiliary storage device 1305 and developed on the memory 1301 and is executed by the CPU 1302. Incidentally, a part of the processing to be performed by allowing the CPU 1302 to execute a program may be performed by hardware (for example, FPGA).

The setting device 1202 is connected to the communication path 1204 through at least one of the communication interface 1304 and the communication interface 1304.

The memory 1301 of the setting device 1202 stores a data input program 1311 for exchanging information with the data storage device 1203, a data classification program 1312 for identifying the type of input data, a parameter setting program 1313 for setting analysis parameters, and a configuration correction program 1314 for correcting the parameter configuration information.

Further, the setting device 1202 stores an input data information table 1321 (refer to FIG. 14), a data item information table 1322 (refer to FIG. 15), a model information table 1323, a configuration information table 1324, and a parameter information table 1325. The input data information table 1321 stores the sensing data. The data item information table 1322 stores information on the data items included in the input data. The model information table 1323 stores the information on the analysis model to which the analysis target is likely to belong. The configuration information table 1324 stores parameter setting configuration information corresponding to each model. The parameter information table 1325 stores setting result information on the analysis parameters to be applied to the analysis target system.

The model information table 1323, the configuration information table 1324, and the parameter Information table 1325 may be the same in configuration as the model information table 223 (FIG. 5), the configuration information table 224 (FIG. 6), and the parameter information table 225 (FIG. 7) according to the first embodiment, and therefore a description of those configurations will be omitted.

Incidentally, in the setting device 1202 according to the present embodiment, the configuration in which various programs and various kinds of information are stored in the memory of one computer is shown. Alternatively, those pieces of information may be stored in the auxiliary storage device 1305, read from the auxiliary storage device 1305 every time processing is performed by the program described above, and stored in the auxiliary storage device 1305 every time each processing has been completed.

Further, the program and the information may be distributed and stored in multiple computers. For example, various types of information may be installed as a database table, stored in a database server different from the setting device 1202, and the program to be executed on the setting device 1202 may refer to and update the information on the database server.

The above-described difference in the method of storing information does not affect the essence of the present invention.

The program to be executed by the CPU 1302 is provided to the setting device 1202 through a removable medium (CD-ROM, flash memory, or the like) or a network, and stored in the nonvolatile auxiliary storage device 205 which is a non-transitory storage medium. For that reason, the setting device 1202 may have an interface for reading data from a removable medium.

The setting device 1202 is a computer system physically configured on one computer or on multiple computers configured logically or physically, which may operate on a separate thread on the same computer or may operate on a virtual machine built on multiple physical computer resources.

Figure 14:
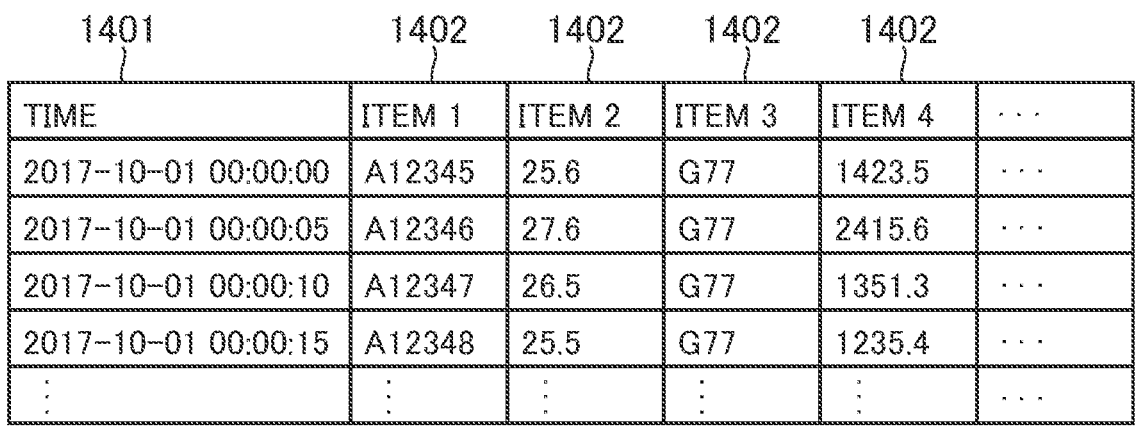
FIG. 14 is a diagram showing a configuration example of an input data information table according to the second embodiment.

FIG. 14 is a diagram showing a configuration example of the input data information table 1321 held by the setting device 1202.

The input data information table 1321 includes a time 1401 indicating a generation time of the sensing data and a data item 1402 indicating the contents of multiple data items.

Figure 15:
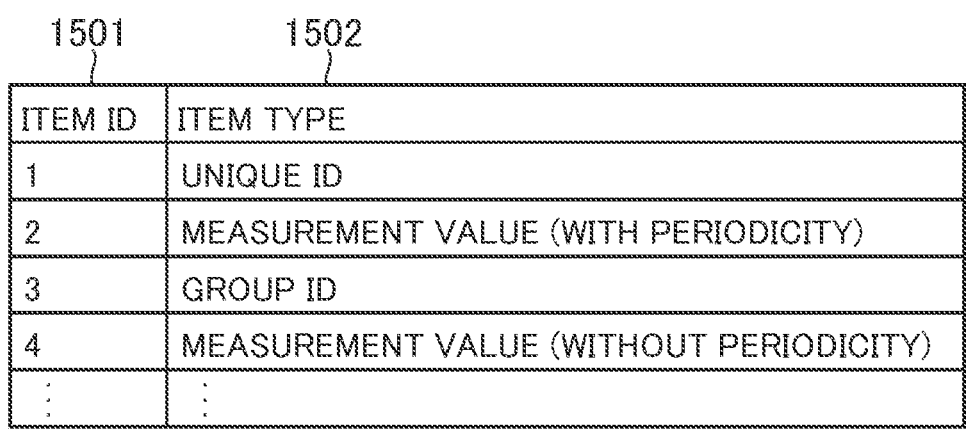
FIG. 15 is a diagram showing a configuration example of a data item information table according to the second embodiment.

FIG. 15 is a diagram showing a configuration example of the data item information table 1322 held by the setting device 1202.

The data item information table 1322 includes an item ID 1501 indicating an identifier for identifying the order of the items and an item type 1502 indicating the type of the items. The type of the data item included in the data item information table 1322 includes "unique ID" in which all data of the item in question are different, "group ID" in which several kinds of data of the data item are present, numerical values "measurement values (with periodicity)" in which data of the data item in question has temporal periodicity, and numerical values "measurement values (with no periodicity) in which data of the data item in question has no temporal periodicity.

The data input program 1311 to be executed by the setting device 1202 exchanges information with the data storage device 1203 through at least one of the input/output interface 1303 and the communication interface 1304, and acquires the sensing data in a predetermined period. Then, the data input program 1311 performs necessary shaping on the sensing data, such as uniforming intervals of the sensing data from the different sensors 1206, and stores the sensing data in the input data information table 1321.

The data classification program 1312 to be executed by the setting device 1202 identifies the type of each data item of the input data based on the sensing data stored in the input data information table 1321 and stores the identification result in the data item information table 1322. For example, as a method of identifying the type, the data classification program 1312 may determine whether a character string of the input data corresponds to regular expression, or not. In addition, mathematical analysis such as frequency analysis and periodicity analysis, or analysis using test functions and external programs can be performed.

FIG. 16 is a flowchart of processing by the parameter setting program 1313 to be executed by the setting device 1202.

In Step 1601, the setting device 1202 activates the parameter setting program 1313 with the storage of a predetermined amount of data (for example, data for one day) in the input data information table 1321 as a trigger. The setting device 1202 may activate the parameter setting program 1313 with satisfaction of a predetermined condition such as elapse of a predetermined time (for example, one month) or detection of specific data by the data classification program 1312 as a trigger.

In Step 1602, the setting device 1202 sets the feature vector of the analysis target to an empty vector (V=[ ]).

In Step 1603, the setting device 1202 extracts the data item whose item type 1502 is "measurement value (with period)" from the data item information table 1322.

In step 1604, the setting device 1202 selects one item in order from the extracted data item, acquires the data of the selected data item from the input data information table 1321, and calculates the average value of the acquired data per hour.

In Step 1605, the setting device 1202 normalizes the average value per hour calculated in Step 1604 so that a maximum value becomes 1, adds the temporal change feature ([x1, x2, . . . , xn]) as the normalized result to the feature vector (V=[x1, x2, . . . , xn]), and records the scale factor for normalization.

In Step 1606, the setting device 1202 determines whether the calculation of the data item of all the "measurement values (with period)" has been completed, or not. If the calculation of the data item of some of "measurement value (with period)" has not been completed, the setting device 1202 returns to Step 1604 and selects the data item of the next "measurement values (with period)." On the other hand, if the calculation of the data item of all the "measurement values (with period)" has been completed, the setting device 1202 proceeds to Step 1607 and extracts the data item whose item type 1502 is "measurement values (with no period)" from the data item information table 1322.

In Step 1608, the setting device 1202 selects one item in order from the data item of the extracted "measurement values (with no period)", acquires the data of the selected data item from the input data information table 1321, and calculates a correlation coefficient of the acquired data.

In Step 1608, the setting device 1202 calculates the correlation coefficient between the data of the item of "measurement values (with no period)" and the data of the item "measurement values (with period)". Alternatively, the setting device 1202 may calculate a correlation coefficient of the items of the two "measurement values (with no period).

In Step 1609, the setting device 1202 adds a correlation coefficient y calculated in Step 1608 to the feature vector (V=[x1, x2, . . . , X n, y]).

In Step 1610, the setting device 1202 determines whether the calculation of all the "measurement values (with no period)" items has been completed, or not. If the calculation of some of "measurement values (with no period)" item has not been completed, the setting device 1202 returns to Step 1608 and selects the next data item. If the calculation of all the "measurement values (with no period)" items has been completed, the setting device 1202 proceeds to Step 1611 and selects one model in order from the model information table 1323.

In Step 1612, the setting device 1202 determines whether the feature vector of the analysis target satisfies the determination condition 503 of the selected model, or not. If the feature vector does not satisfy the determination condition 503 of the selected model, the setting device 1202 returns co Step 1611 and selects the next model. On the other hand, if the feature vector of the analysis target satisfies the determination condition 503 of the selected model, the setting device 1202 proceeds to Step 1613, and acquires parameter configuration information that matches the model ID of the model satisfying the condition from the configuration information table 1324.

Next, in Step 1614, the setting device 1202 calculates the analysis parameter based on the acquired parameter configuration information, stores the calculated analysis parameter in the parameter information table 1325, and transmits the analysis parameter to the analysis device 1201 through at least one of the input/output interface 1303 and the communication interface 1304.

Finally, in Step 1615, the setting device 1202 completes the parameter setting program 1313.

FIG. 17 is a flowchart of processing by the configuration correction program 1314 to be executed by the setting device 1202.

In Step 1701, the setting device 1202 activates the configuration correction program 1314 with the parameter correction feedback information from the analysis device 1201 as a trigger.

In Step 1702, the setting device 1202 acquires from the parameter information table 1325 a value before correction of the parameter requested to be corrected from the analysis device 1201.

In Step 1703, the setting device 1202 calculates a ratio between the corrected value of the parameter requested to be corrected and the value before correction.

In Step 1704, the setting device 1202 acquires from the configuration information table 1324 the parameter configuration information of the corrected parameter of the model whose analysis target satisfies the model determination condition 503.

In Step 1705, the setting device 1202 stores a value obtained by multiplying the acquired parameter configuration information by the calculated ratio in the configuration information table 1324.

Finally, in Step 1615, the setting device 1202 completes the configuration correction program 1314.

According to the second embodiment, when the set parameter has been corrected, the parameter setting configuration can be corrected from the parameter correction result. In particular, when one setting device 1202 sets the parameter to the multiple analysis devices 1201, or when one analysis system analyzes the multiple analysis targets, an improvement in parameter configuration due to user correction can be shared.

As described above, the analysis device 102 and the setting device 1202 according to the embodiments of the present invention execute the configuration information table 224, the data input program 211, the temporal change feature calculation program 213, the relevance feature calculation program 214, the model determination program 215, and the parameter setting program 212. The configuration information table 224 stores the parameter setting configuration for each model corresponding to the analysis target system. The data input program 211 acquires the tame series data including data of the multiple items from the analysis target system. The temporal change feature calculation program 213 extracts the data (periodically changing data) of at least one first item from the time series data and calculates a temporal change feature of the data of the first item. The relevance feature calculation program 214 extracts the data of at least one second item from the time series data and calculates a feature of at least one relevance of the relevance between the data of the first item and the data of the second item, and the relevance between the data of the multiple second items. The model determination program 215 determines the model corresponding to the analysis target system based on the calculated temporal change feature and the calculated relevance feature. The parameter setting program 212 sets the parameter in the analysis target system with the use of the parameter setting configuration of the model corresponding to the analysis target system. As a result, the analysis device 102 and the setting device 1202 can automatically set the parameters suitable for the system to be analyzed.

Also, the temporal change feature calculation program 213 calculates statistical values (for example, average value, variance, deviation value, maximum value, minimum value, and so on) at predetermined time intervals obtained by dividing the data of the first item on the time axis, and sets a value obtained by normalizing the calculated statistical value as the temporal change feature of the first item. Therefore, the temporal change feature calculation program 213 can determine the model based on the periodic change of the time series data.

Further, the parameter setting program 212 performs calculation with the normalization coefficient (scale factor) as an argument, which is defined in the parameter setting configuration of the model corresponding to the analysis target system, calculates the parameters corresponding to the scale of the analysis target system, and sets the calculated, parameters in the analysis target system. As a result, the parameter setting program 212 can determine an appropriate parameter according to the system scale (quantitative feature).

Further, the relevance characteristic calculation program 214 sets the ratio of the statistical value (for example, the average value, the variance, the deviation value, the maximum value, the minimum value, and so on) of the first item and the statistical value (for example, the average value, the variance, the deviation value, the maximum value, the minimum value, and so on) of the second item as the feature of the relevance, or sets the ratio of the statistical values (for example, the average value, the variance, the deviation value, the maximum value, the minimum value, and so on) of the two second items as the relevance feature. Therefore, the relevance characteristic calculation program 214 can determine the model with the use of the relevance between the items as the auxiliary parameters as an auxiliary parameter representing the feature of the system.

Further, the relevance feature calculation program 214 sets a value (for example, a correlation coefficient or the like) indicating the correlation between the data of the first item and the data of the second item as the relevance feature, or sets a value (for example, correlation coefficient or the like) indicating the correlation of the data of the second items as the relevance feature. Therefore, the relevance feature calculation program 214 can determine the model with the use of the relationship between the items as an auxiliary parameter representing the feature of the system.

Further, when a correction of a parameter is requested, since the configuration correction program 1314 for correcting other parameters is executed according to the required parameter correction ratio, an input of the operator can be reflected in the parameter information table 1325.

Further, since processing for setting the parameters to be applied to the analysis target system is executed at a timing satisfying a predetermined condition (for example, storage of a predetermined amount of data, elapse of a predetermined time, detection of specific data, and so on), the parameters can be set at an appropriate timing.

Although the present disclosure has been described with reference to example embodiments, those skilled in the art will recognize that various changes and modifications may be made in form and detail without departing from the spirit and scope of the claimed subject matter.

For example, the embodiments described above have been described in detail for easy description of the present invention, and the present invention is not always limited to the provision of all the configurations described above. Further, a part of the configuration of one embodiment may be replaced by the configuration of another embodiment. Also, the configuration of another embodiment may be added to the configuration of one embodiment. Further, in a part of the configuration of each embodiment may be subjected to addition, deletion, and replacement of another configuration.

Also, some or all of the above-described respective configurations, functions, processors, processing units, and so on may be realized with hardware, for example, by designed with an integrated circuit, and may be realized with software by allowing the processor to interpret and execute programs for realizing the respective functions.

The information on the program, table, file, and so on for realizing the respective functions can be stored in a storage device such as a memory, a hard disk, or an SSD (solid state drive), or a recording medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

In addition to those described in the Claims, the disclosure of the Specification includes the following invention:

A program for causing a computer to set a parameter, wherein the computer includes an arithmetic device that executes a predetermined process, a storage device that is connected to the arithmetic unit, and a communication interface that is connected to the arithmetic device, the program comprising the steps of:

acquiring time-series data including data of a plurality of items from an analysis target system;

extracting data of at least one first item from the time series data and calculating a feature of a temporal change of the data of the first item;

extracting data of at least one second item from the time series data and calculating a feature of at least one of a relevance between the data of the first item and the data of the second item and a relevance between the data of a plurality of the second items;

determining a model corresponding to the analysis target system based on the feature of the temporal change and the change of the relevance; and setting the parameter in the analysis target system by using the parameter setting configuration of the model corresponding to the analysis target system.

What is claimed is:

1. A method of setting a parameter by a data analysis device,
wherein the data analysis device includes a computer that executes one or more predetermined processes, a storage device that is connected to the computer, and a communication interface that is connected to the computer,
the storage device stores: a parameter setting configuration for each of a plurality of models corresponding to an analysis target system, and input data,
the method comprising the steps of:
acquiring time-series data including packets of network traffic as packets are transferred in the network and continuously and automatically storing a plurality of items of the acquired time-series of data in predetermined intervals as the input data in the storage device;
extracting data of at least one first item from the input data and calculating a feature of a temporal change of the data of the first item by the computer;
extracting data of at least one second item from the input data and calculating a feature of at least one of a relevance between the data of the first item and the data of the second item and a relevance between the data of a plurality of the second items by the computer;
determining a model, of a plurality of models, that corresponds to the analysis target system based on the feature of the temporal change and the feature of the calculated relevance, wherein each model is an analysis method;
setting the parameter in the analysis target system based on the parameter setting configuration of the determined model corresponding to the analysis target system by the computer; and
analyzing the network traffic of the analysis target system using the set parameter,
wherein in the step of calculating the feature of the temporal change, the computer calculates a statistical value for each predetermined time obtained by dividing the data of the first item on a time axis, and sets a normalized value of the statistical value as the feature of the temporal change of the first item.

2. The method according to claim 1,
wherein in the step of calculating the feature of the temporal change, the computer includes a step of recording a normalization coefficient used when the statistical value is normalized, and
in the step of setting the parameter, the computer performs an operation with the normalization coefficient as an argument, which is defined in the parameter setting configuration of the model corresponding to the analysis target system, calculates the parameter corresponding to a scale of the analysis target system, and sets the calculated parameter in the analysis target system.

3. The method according to claim 1,
wherein in the step of calculating the feature of the relevance,
the computer calculates the statistical value of the data of the first item, calculates the statistical value of the data of the second item, and sets a ratio between the statistical value of the first item and the statistical value of the second item as the feature of the relevance, or
the computer calculates the statistical value of the data of the second item and sets the ratio of the statistical values of two second items as the feature of the relevance.

4. The method according to claim 1,
wherein in the step of calculating the feature of the relevance,
the computer sets a value indicating a correlation between the data of the first item and the data of the second item as the feature of the relevance, or
the computer sets a value indicating a correlation between data of the two second items as the feature of the relevance.

5. The method according to claim 1, further comprising a step of correcting another parameter according to a ratio of the correction of the parameter upon receiving a requirement for correction of the parameter by the computer.

6. A data analysis device that can set a parameter, the data analysis device comprising:
a computer comprising a processor that executes one or more predetermined processes, a storage device that is connected to the computer, and a communication interface that is connected to the computer,
wherein the storage device stores a parameter setting configuration for each of a plurality of models corresponding to an analysis target system, and input data;
wherein the computer is programmed to:
acquire time-series data including packets of network traffic as packets are transferred in the network and continuously and automatically stores a plurality of items of the acquired time-series of data in predetermined intervals as the input data in the storage device;

extract data of at least one first item from the input data and calculate a feature of a temporal change of the data of the first item;

extract data of at least one second item from the input data and calculate a feature of at least one of a relevance between the data of the first item and the data of the second item and a relevance between the data of a plurality of the second items;

determine a model, of a plurality of models, corresponding to the analysis target system based on the feature of the temporal change and the feature of the calculated relevance, wherein each model is an analysis method;

set the parameter in the analysis target system based on the parameter setting configuration of the determined model corresponding to the analysis target system; and analyzing the network traffic of the analysis target system using the set parameter, wherein the computer is further programmed to calculate a statistical value for each predetermined time obtained by dividing the data of the first item on a time axis, and sets a normalized value of the statistical value as the feature of the temporal change of the first item.

7. The data analysis device according to claim 6,
wherein the computer is further programmed to:
record a normalization coefficient used when the statistical value is normalized, and
perform an operation with the normalization coefficient as an argument, which is defined in the parameter setting configuration of the model corresponding to the analysis target system, calculate the parameter corresponding to a scale of the analysis target system, and set the calculated parameter in the analysis target system.

8. The data analysis device according to claim 6,
wherein the computer is further programmed to: calculate the statistical value of the data of the first item, calculate the statistical value of the data of the second item, and set a ratio between the statistical value of the first item and the statistical value of the second item as the feature of the relevance, or
calculate the statistical value of the data of the second item and sets the ratio of the statistical values of two second items as the feature of the relevance.

9. The data analysis device according to claim 6,
wherein the computer is further programmed to: set a value indicating a correlation between the data of the first item and the data of the second item as the feature of the relevance, or
the computer stores a value indicating a correlation between data of the two second items as the feature of the relevance.

10. The data analysis device according to claim 6, wherein the computer is further programmed to correct, upon receiving a requirement for correction of the parameter, another parameter according to a ratio of the required correction of the parameter.

11. The data analysis device according to claim 6, wherein the computer executes a process of setting the parameter applied to the analysis target system at a predetermined timing.

* * * * *